United States Patent Office 3,362,965
Patented Jan. 9, 1968

3,362,965
BETA-LACTONES OF 3 - HYDROXY - 4,4 - BIS(PERFLUOROALKYL) - 3 - BUTENOIC ACIDS AND THEIR METHOD OF PREPARATION
David C. England and Carl G. Krespan, Wilmington, Del., assignors to E. I. du Pont de Nemours and Company, Wilmington Del., a corporation of Delaware
No Drawing. Filed Dec. 8, 1965, Ser. No. 512,532
6 Claims. (Cl. 260—343.9)

This application relates to the mixed dimers composed of aldoketenes and bis(perfluoroalkyl)ketenes and to the process of their preparation.

The prior art long has recognized that the first member of the aldoketene series, ketene, spontaneously dimerizes to produce a structure which, by weight of analytical evidence, is believed to be a β-lactone of 3-hydroxy-3-butenoic acid. On the other hand, it has been discovered that the ketoketenes, bis(perfluoroalkyl)ketenes, are quite stable as monomers (see copending coassigned application of Sam Andreades and David C. England, S.N. 283,958, filed May 29, 1963, now abandoned). For example, bis(trifluoromethyl)ketene is unchanged during long periods of storage at low temperature, or even on heating for 2 hours at 200° C. At 300° C. bis(trifluoromethyl)ketene is partially isomerized to perfluoromethacrylyl fluoride.

In the copending coassigned application of David C. England and Carl G. Krespan, S.N. 369,588, filed May 22, 1964, now U.S. Patent No. 3,280,150, has been disclosed the discovery that perfluoroalkyltrifluoromethylketenes can be made to react in the presence of nucleophilic catalysts, in the liquid phase, to produce a variety of products, among which is a β-lactone of 3-hydroxy-3-butenoic acid.

It now has been discovered that a mixed aldoketene-ketoketene dimer can be prepared spontaneously by the interaction of monomeric aldoketene and a bis(perfluoroalkyl)ketene wherein the alkyl groups contain 1–8 carbon atoms. In the process of the instant invention this mixed dimer is formed in good yields, to the substantial exclusion of the dimer of the aldoketene. The reactants necessary for the formation of the mixed dimers, i.e., the β-lactones of 3-hydroxy-4,4-bis(perfluoroalkyl)-3-butenoic acid, are aldoketenes, RHC=C=O, wherein R is selected from the group consisting of hydrogen and alkyl containing 1–8 carbon atoms, and the ketoketene $(R_f)_2C$=C=O wherein each $R_f$ is perfluoroalkyl of 1–8 carbon atoms. The two $R_f$ groups can be the same or different. The conditions for carrying out the process of the instant invention must be such that the aldoketene and the bis(perfluoroalkyl)ketene are liquids. The minimum reaction temperature generally is determined by the melting point of the aldoketene. Usually the reaction is carried out at a temperature in the range −100° to +25° C. Autogenous pressures of subatmospherica to about 50 atm. are employed. Although the reaction generally is quite rapid, i.e., occurs substantially within 1 to 2 minutes, reaction times may be extended to 1 to 2 hours. The reaction is carried out in neutral process equipment, for example, glass, either with or without an added neutral liquid reaction medium being present. Aprotic, substantially neutral, liquid reaction media which can be employed herein are the dialkyl ethers, the ethylene glycol and diethylene glycol dialkyl ethers, benzene, petroleum ether, chloroform, carbon tetrachloride and the perfluorinated and per(chlorofluorinated)hydrocarbons. The reaction can be carried out by vacuum distilling the aldoketene (freshly prepared by cracking of the dimer) into a Carius tube cooled in liquid nitrogen and adding by a similar technique the bis(perfluoroalkyl)ketene (order of addition of the ketenes is not critical). After sealing the tube and jacketing with a fiberglass sleeve it is allowed to warm up while being agitated by means of a mechanical shaker. The reaction is rapid and exothermic, especially after complete liquefaction of the charge is achieved. Although the molar ratio of fluorinated ketene to the aldoketene can be varied widely, generally, this ratio will vary from about 0.5:1 to 2.0:1. Preferably, the molar ratio is about 1:1. The instant invention is illustrated, but is not intended to be limited, by the following examples.

Example I

Freshly prepared ketene (6 g., 0.14 m.) (from cracking of the dimer) was vacuum distilled into a Carius tube (150 cc. capacity) cooled in liquid nitrogen. Bis(trifluoromethyl)ketene (37 g., 0.21 m.) was then condensed into the tube and the tube was sealed. It was then inserted into a fiberglass sleeve and shaken horizontally in a mechanical shaker. Reaction was rapid and exothermic when the mixture melted. After cooling to room temperature it was further cooled in liquid nitrogen and opened to a "Dry-Ice"-cooled trap. On warming the tube slightly above room temperature (ca. 30° C.) there was recovered 16.5 g. of bis(trifluoromethyl)ketene in the "Dry-Ice" trap. The residue was distilled to give 23.6 g. (76%) of the β-lactone of 3-hydroxy-4,4-bis(trifluoromethyl)-3-butenoic acid, B.P. 37° C./3.8 mm., $n_D^{25}$ 1,3628. Infrared absorption analysis showed bands at 5.12μ (C=O) and 5.74μ (C=C). The proton N.M.R. peak was centered at 5.6τ and the $F^{19}$ N.M.R. consisted of two quartets. There was weak splitting between the fluorine and hydrogen.

*Analysis.*—Calcd. for $C_6H_2F_6O_2$: C, 32.75; H, 0.92; F, 51.82. Found: C, 33.06; H, 1.14; F, 51.35.

Example II

Example I was repeated using 8 g., 0.19 m., of freshly prepared ketene and 34 g., 0.19 m., of bis(trifluoromethyl)ketene. The yield of product, identical with that of Example I, was 37 g. (89%).

The products of the invention listed in the right-hand column of Table I are readily prepared by substituting the bis(perfluoroalkyl)ketenes in the left-hand column for bis(trifluoromethyl)ketene in the procedure of Example II.

TABLE I

| Ex. | Bis(perfluoroalkyl)-ketene | β-lactone Product |
|---|---|---|
| III | Pentafluoroethyltrifluoromethylketene. | β-lactone of 3-hydroxy-4-pentafluoroethyl-4-trifluoromethyl-3-butenoic acid. |
| IV | Trifluoromethylheptafluoro-n-propylketene. | β-lactone of 3-hydroxy-4-heptafluoro-n-propyl-4-trifluoromethyl-3-butenoic acid. |
| V | Nonafluorobutyltrifluoromethylketene. | β-lactone of 3-hydroxy-4-nonafluorobutyl-4-trifluoromethyl-3-butenoic acid. |
| VI | Trifluoromethylheptadecafluoro-n-octylketene. | β-lactone of 3-hydroxy-4-heptadecafluoro-n-octyl-4-trifluoromethyl-3-butenoic acid. |

Example VII

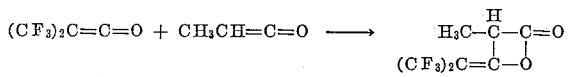

*Part A.*—Methylketene was prepared by pyrolysis of propionic anhydride under vacuum (ca. 1 mm.) in a vertically mounted quartz tube (1″ diameter and 22″ long) packed with quartz chips and heated in the center section to about 600° C. with an electric furnace. The anhydride was added at the top of the tube and the pyrolysis products were passed through two U traps connected in series to the bottom of the tube. The first trap was cooled with Dry Ice-acetone (−80° C.) and the second with liquid nitrogen. Propionic acid and any unreacted propionic anhydride collected in the first trap and only methylketene, having a yellow color, passed into the second trap and was condensed there.

Part B.—Before starting the generation of methylketene 72 g. of bis(trifluoromethyl)ketene was condensed into the second (liquid nitrogen-cooled) trap. Propionic anhydride (50 g.) was then added dropwise to the heated tube and the methylketene generated was collected on top of the frozen fluoroketene in the trap. When addition of the anhydride was complete, this trap, while still under vacuum but with the pump off, was rapidly immersed in a Dry Ice-acetone bath (−80° C.). Very soon an exothermic reaction occurred and the mixture changed from yellow to white. There was recovered by distillation 27 g. of bis(trifluoromethyl)ketene (indicating that 45 g. has reacted, equivalent to 14 g. of methylketene), and 36 g. (51%) of the β-lactone of 3-hydroxy-2-methyl-4,4-bis(trifluoromethyl)-3-butenoic acid. The structure of the β-lactone was verified by infrared, nuclear magnetic resonance and elemental analysis. Infrared absorption showed carbonyl absorption at 5.2μ and exocyclic double bond absorption at 5.85μ. Proton N.M.R. showed a methyl doublet (J=7 c.p.s.) centered at 1.2, and a proton quartet (J=7 c.p.s.) centered at 4.2. The $F^{19}$ N.M.R. showed the non-equivalent trifluoromethyl groups as a complex multiplet centered at about 3342 c.p.s. upfield from fluorotrichloromethane as reference.

Analysis.—Calcd. for $C_7H_4F_6O_2$: C, 35.93; H, 1.72; F, 48.72. Found: C, 36.08; H, 2.00; F, 47.37.

When ethylketene is substituted for methylketene in Example VII, the product is the β-lactone of 2-ethyl-3-hydroxy-4,4-bis(trifluoromethyl)-3-butenoic acid.

The bis(perfluoroalkyl)ketenes which are operable in the instant invention can be prepared by hydrolyzing a 1,1-difluoro-2,2-bis(perfluoroalkyl)ethylene, wherein the perfluoroalkyl group contains 1–8 carbon atoms, and thereafter pyrolyzing the resultant bis(perfluoroalkyl) acetic acid in the presence of a strong dehydrating agent, for example, phosphorus pentoxide. The process conditions necessary for the above-described pyrolysis reaction will vary as a function of the length of the carbon chains of the $R_f$ radicals. As the carbon chain content of the $R_f$ radicals increases, it will be preferred to effect the reaction at reduced pressures, e.g., desirably of the order of 50 to 200 mm. of mercury, and also to operate at temperatures below 300° C. The following example demonstrates the preparation of bis(trifluoromethyl)ketene.

*Example A*

Part A.—A gas (approximate composition 18% perfluoroisobutene (PFIB) and 82% perfluorocyclobutane) was passed through a cold mixture of tetrahydrofuran and water and then through methanol. A series of three 500-ml. gas-washing bottles cooled in ice baths was used. In each bottle the gas passed through a sintered-glass disc and then bubbled through the liquid present. Each of the first two bottles contained a mixture of tetrahydrofuran and water (100 ml. of each). The third bottle contained 200 ml. of methanol. In five hours 206 l. of gas had been scrubbed which corresponded to about 1.5 moles of PFIB. The methanol in the third scrubber was mixed with an equal amount of water and the heavy layer distilled to yield 165 g. (0.7 mole) of

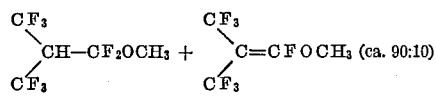

Both of the tetrahydrofuran:water scrubbers contained two phases. They were combined and the lower layer (500 cc.) separated from the upper (200 cc.). To the lower layer was slowly added 500 cc. conc. $H_2SO_4$ and the mixture continuously extracted with methylene chloride (about 500 cc.) overnight. Distillation of the extract yielded 121 g. (0.62 mole) of α-hydrohexafluoroisobutyric acid, boiling point 90° C./190 mm., which solidified at room temperature. Allowing for the methanol adduct, the yield was 77%. Recrystallized from hexane, the acid melted at 50° C. Knunyants et al., Bull Acad. Sci., U.S.S.R., Div. Chem. Sci., 1956, 1387, report a melting point of 49.5–50.5° C. When titrated potentiometrically, the pKa was 2.35 and the neutral equivalent 198 (theory 196).

Part B.—α-Hydrohexafluoroisobutyric acid (196 g.) (one molar proportion) which had been ground in a mortar was mixed well with 284 g. (two molar proportions) of phosphorus pentoxide in a 2 l. one-neck flask with some cooling in a cold water bath. After mixing, the material was spread evenly over the bottom half of the flask. A cold-water condenser with a solid carbon dioxide trap attached was then connected to the flask which was then heated strongly for about four hours at about 200–300° C. Bis(trifluoromethyl)ketene began to collect in the solid carbon dioxide trap. A total of 110 cc. (about 175 g.; impurity 2–3% $POF_3$) was collected. On distillation through a low-temperature still the pure bis(trifluoromethyl)ketene boiled at +5° C.; yield 168 g. (94% of theory).

Additional information relating to the synthesis of bis(perfluoroalkyl)ketenes can be found in the aforesaid copending coassigned application, S.N. 283,958.

The products of this invention are useful for imparting water repellancy to paper and textile materials. This is illustrated by the following example.

*Example B*

A few drops of the above β-lactone of Example I were placed on a filter paper, and the paper along with a control piece (nothing added) was warmed with hot air until it appeared dry. Both pieces of paper were then dipped into a beaker of water. It was immediately obvious where the added drops of lactone had reacted with the paper as only this portion was not saturated by the water even after several minutes soaking. When removed from the beaker, water drained from the treated portion of the paper which remained dry but the untreated paper was wet throughout.

The same waterproofing was observed on cotton when cotton cloth was substituted for paper in Example F.

The foregoing detailed description has been given for clearness of understanding only and no unnecessary limitation are to be understood therefrom. The invention is not limited to the exact details shown and described, for obvious modifications will occur to those skilled in the art.

The embodiments of the invention in which an exclusive property or privilege is claimed are defined as follows:

1. A compound of the formula.

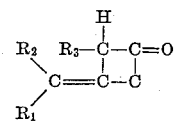

wherein $R_1$ and $R_2$ can be the same or different and each represents perfluoroalkyl groups containing 1–8 carbon atoms and $R_3$ is a member selected from the class consisting of hydrogen and alkyl containing 1–8 carbon atoms.

2. The compound of claim 1 wherein $R_1$ and $R_2$ are trifluoromethyl groups, and $R_3$ is hydrogen, said compound being the β-lactone of 3-hydroxy-4,4-bis(trifluoromethyl)-3-butenoic acid.

3. A β-lactone of claim 1, wherein $R_3$ is methyl and $R_1$ and $R_2$ are trifluoromethyl groups, said β-lactone being the β-lactone of 3-hydroxy-2 - methyl - 4,4 - bis(trifluoromethyl)-3-butenoic acid.

4. The process for preparing the β-lactone of claim 1 comprising the steps of reacting an aldoketene,

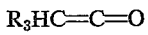

wherein $R_3$ is a member selected from the class consisting of hydrogen and alkyl which contains 1–8 carbon atoms and a bis(perfluoroalkyl)ketene wherein each of said perfluoroalkyl groups contains 1–8 carbon atoms, under autogenous pressure in the liquid phase, and thereafter recovering said β-lactone.

5. The process of claim 4 wherein said aldoketene is ketene and said bis(perfluoroalkyl)ketene is bis(trifluoromethyl)ketene and wherein the reaction is carried out at a temperature of −100° to +25° C.

6. The process of claim 4 wherein said aldoketene is methylketene and said bis(perfluoroalkyl)ketene is bis(trifluoromethyl)ketene and wherein the reaction is carried out at a temperature of −100° to +25° C.

References Cited

Hanford et al.: Organic Reactions, Chap. 3, vol. III, Adams et al., pp. 108 et seq. (1947).

Knunyants et al.: Academy of Science of the U.S.S.R. Div. of Chem. Sci. (1960), 640–46 (translation), from Izvest Akad. Nauk SSR Ser. Khun. (1960), No. 4, p. 678 et seq.

ALEX MAZEL, *Primary Examiner.*

J. NARCAVAGE, *Assistant Examiner.*

UNITED STATES PATENT OFFICE
CERTIFICATE OF CORRECTION

Patent No. 3,362,965　　　　　　　　　　　　　　January 9, 1968

David C. England et al.

It is hereby certified that error appears in the above numbered patent requiring correction and that the said Letters Patent should read as corrected below.

Column 1, line 56, for "subatmospherica" read -- subatmospheric --; column 4, line 46, for "F" read -- B --; lines 56 to 62, the formula should appear as shown below instead of as in the patent:

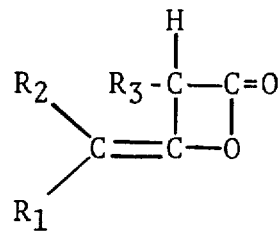

(SEAL)　　　　Signed and sealed this 25th day of February 1969.
Attest:

Edward M. Fletcher, Jr.　　　　　　　　　　　　EDWARD J. BRENNER
Attesting Officer　　　　　　　　　　　　　　　Commissioner of Patents